United States Patent [19]

Nishiyama et al.

[11] Patent Number: 5,107,466
[45] Date of Patent: Apr. 21, 1992

[54] ULTRASONIC DOPPLER FLOW METER

[75] Inventors: Hisashi Nishiyama, Tokyo; Toshio Ogawa, Chiba; Kageyoshi Katakura, Tokyo, all of Japan

[73] Assignee: Hitachi Medical Corporation, Tokyo, Japan

[21] Appl. No.: 611,541

[22] Filed: Nov. 13, 1990

[30] Foreign Application Priority Data

Nov. 13, 1989 [JP] Japan .................................. 1-292338

[51] Int. Cl.$^5$ ............................................. G01S 15/00
[52] U.S. Cl. ................................................ 367/90
[58] Field of Search ........................... 367/89-91; 73/861.18, 861.25

[56] References Cited

U.S. PATENT DOCUMENTS 4,809,703  3/1989  Ishikawa et al. ............... 128/661.08
4,905,206  2/1990  Nishiyama et al. ................... 367/90

FOREIGN PATENT DOCUMENTS 58-188433  11/1983  Japan .
60-119929   6/1985  Japan .
61-025527   2/1986  Japan .

OTHER PUBLICATIONS

Baker, Pulsed Ultrasonic Doppler Blood-Flow Sensing: IEEE Trans. SU-17, No. 3, pp. 170–185, 1970.
Kasi, Real-Time Two Dimensional Blood Flow Imaging Technique, IEEE Trans. SU-32, No. 3, pp. 458–464, 1985.
Ultrasonic Symposium Proceedings, pp. 348–352, 1978.

*Primary Examiner*—Daniel T. Pihulic
*Attorney, Agent, or Firm*—Antonelli, Terry, Stout & Kraus

[57] ABSTRACT

A flow meter for detecting the average speed of an object in such a manner that an ultrasonic pulsed continuous wave is repeatedly transmitted toward the object to obtain a phase vector from the reception signal of the wave reflected from the object, the phase difference between consecutive ones of phase vectors obtained at an interval T equal to the period of transmitted wave is detected, a plurality of phase difference values are added and averaged to obtain an average phase difference value, and a Doppler frequency is calculated from the average phase difference value to obtain the average speed of the object, in which in order to remove an error caused by aliasing of an angle in the course of the arithmetic operation for obtaining the average phase difference value, a plurality of presumed average phase difference values having the error are calculated from the average phase difference value, the difference between the change of a phase caused by adding the phase difference values successively and the change of phase based upon each of the presumed average phase difference values is estimated to select the most appropriate one of the presumed average phase difference values, and the selected average phase difference value is used as a corrected average phase difference value.

5 Claims, 4 Drawing Sheets

ULTRASONIC DOPPLER FLOW METER

CROSS-REFERENCE TO RELATED APPLICATIONS

The present application relates to the subject matter described in application Ser. No. 609,657 filed on Nov. 6, 1990 (claiming priority based on Japanese Patent Application No. 01-288908 filed on Nov. 8, 1989) entitled "Ultrasonic Doppler Flow Meter," by the same inventors and assigned to the same assignee of the present application.

BACKGROUND OF THE INVENTION

The present invention relates to a pulse Doppler measuring apparatus, and more particularly to an apparatus for detecting the velocity of an object by using an ultrasonic wave, for example, a pulse Doppler measuring apparatus capable of measuring the speed of blood flow with a high signal-to-noise ratio, in a case where the blood flow speed in a living body is measured in real time.

Various kinds of apparatuses have hitherto been known which detect the flow speed of an object by utilizing the Doppler effect of an acoustic wave. Specifically, in an apparatus using the pulse Doppler method which is described in, for example, an article entitled "Pulsed Ultrasonic Doppler Blood Flow Sensing" by D.W. Baker (IEEE Trans. SU-17, No. 3, pages 170 to 185, 1970), as is known, it is possible to specify a measured part by transmitting an ultrasonic pulsed continuous wave repeatedly and by setting a time gate corresponding to the distance to the measured part on a reception signal.

As conventional ultrasonic Doppler blood flow measuring apparatuses, as disclosed in, for example, JP-A-58-188433, JP-A-60-119929, and JP-A-61-25527, there are known apparatuses for measuring a blood flow by transmitting an ultrasonic wave toward a blood vessel and by measuring the Doppler shift frequency of the ultrasonic wave reflected from the blood in the blood vessel to measure $v\cos\theta$, where $\theta$ indicates the angle between the direction of the blood flow and the transmission direction of the ultrasonic wave, and indicates a blood flow speed.

Further, a technique called "color flow mapping" for measuring the distribution of blood flow speed at a certain cross section of a living body to display the distribution on a tomographic image, is described in an article entitled "Real-Time Two-Dimensional Blood Flow Imaging Using an Autocorrelation Technique" by C. KASAI et al., IEEE Trans. SU-32, No. 3, pages 458 to 464, 1985. In order to achieve a desired image frame rate in the color flow mapping, the blood flow speed at each of pixels is determined by averaging the measured values of a plurality of Doppler shift obtained by a relatively small number of measurements. In the example described above, the autocorrelation method is used, in which a difference vector between a vector indicated by a Doppler signal detected currently and a vector indicated by a Doppler signal detected by the preceding measurement is detected by an autocorrelator each time the measurement is repeated, and an average speed is calculated from the argument of a vector given by the sum of a plurality of difference vectors.

Meanwhile, U.S. Pat. No. 4,809,703 discloses the so-called "two axial component method", in which the phase difference $\Delta\theta$ of a Doppler signal is detected each time the measurement is repeated, to be decomposed into a cosine component and a sine component, a plurality of values obtained for each of these components are added and averaged, and the phase difference indicated by the average cosine component and the average sine component is transformed into a velocity.

Further, on pages 348 to 352 of 1978 Ultrasonic Symposium Proceedings is described a method, in which the phase difference of a Doppler signal is obtained each time the measurement is repeated, an average phase difference is calculated by adding a plurality of the phase difference values directly, and the average phase difference thus obtained is transformed into a velocity. This method will hereinafter be referred to as "phase difference averaging method".

Meanwhile, it is pointed out by U.S. Pat. No. 4,905,206 that when a true average phase difference is close to $+\pi$ or $-\pi$, that is, a high-speed region is measured, the phase difference averaging method produces a large calculation error, and that when the true average phase difference is close to zero, that is, a low-speed region is measured, the autocorrelation method and the two axial component method produce a large calculation error. Further, in this U.S. Patent are described a circuit configuration for changing one of the two methods over to the other so that the above difficulties are eliminated, and a circuit configuration for transforming phase difference values obtained by repeated measurement into phase difference values in a new polar coordinate system having a reference axis which is indicated by the angle of the average phase difference calculated by the autocorrelation method, and for adding and averaging the phase difference values in the new polar coodinate system.

SUMMARY OF THE INVENTION

It has been known by the further investigation conducted by the present inventors that even when one of the autocorrelation method and the phase difference averaging method is changed over to the other as disclosed in U.S. Pat. No. 4,905,206, it is impossible to completely avoid the effect of an error which is introduced by a process for adding angles in accordance with the phase difference averaging method.

It is accordingly an object of the present invention to provide a Doppler flow meter which can calculate a correct average phase difference value by correcting an error and thus can obtain a correct velocity, and to provide an error correcting method used in the above Doppler flow meter.

According to the phase difference averaging method, in which an angle obtained by adding and averaging a plurality of phase difference angles is used as an average value, when a true phase difference angle exceeds 180° or becomes less than −180°, an error is produced by the aliasing of the phase difference angle. Hence, in the error correcting method according to the present invention, a plurality of presumed averaged values having the above error are first calculated from the average value obtained by adding and averaging a plurality of phase difference angles. Next, for each of the presumed average values, the difference between each of those ones of integrated values obtained by adding the phase difference angles successively which are detected at a plurality of time points, and a corresponding one of integrated values of the presumed average value is calculated. The sum of the absolute values of principal values of a plurality of values of the above difference is calculated to be used as an index for indicating the appropriateness of each presumed average value. The indexes thus obtained are compared to select the most appropriate one of the presumed average values. The selected average value is used as the corrected average value of the phase difference angles.

When the above-mentioned aliasing of angle occurs once, the error in the sum of angles is equal to $+360°$ or $-360°$. Accordingly, when the number of sampled phase difference values to be averaged and an average value to be corrected are expressed by N and $\Delta\theta$, respectively, a plurality of presumed average values which are to be estimated on the basis of the indexes, are indicated by $\overline{\Delta\theta}$ and $\overline{\Delta\theta} \pm m \cdot 360°/N$ where $m = 1, 2, 3$, and so on. For example, in a case where five presumed average values are estimated, the presumed average values are given by the following equation:

$$\overline{\Delta\theta}_k = \overline{\Delta\theta} + \frac{(k-3) \cdot 360°}{n}, \text{ where } k = 1, 2, 3, 4 \text{ and } 5.$$

where $k = 1, 2, 3, 4$ and $5$.

Further, an apparatus according to the present invention is characterized by comprising first average phase difference calculating means for calculating autocorrelation between two consecutive ones of successively obtained phase vector signals and for adding a plurality of phase difference vectors obtained by the autocorrelation to calculate the argument of a vector given by the sum of the phase difference vectors, second average phase difference calculating means for detecting the phase difference between two consecutive ones of successively obtained phase vector signals to add and average a plurality of phase difference angles, error correcting means for correcting the average phase difference obtained from the second average phase difference calculating means by the above-mentioned method, and selection means for selecting one of the output of the first average phase difference calculating means and the corrected output of the second average phase difference calculating means. The selection means selects the corrected output of the second average phase difference calculating means to use the selected output as a blood flow speed, when the output of the first average phase difference calculating means is less than a predetermined threshold value. Further, when the output of the first average phase difference calculating means exceeds the predetermined threshold value, this output is selected to be used as a blood flow speed.

DESCRIPTION OF THE PREFERRED EMBODIMENTS

Figure 1:
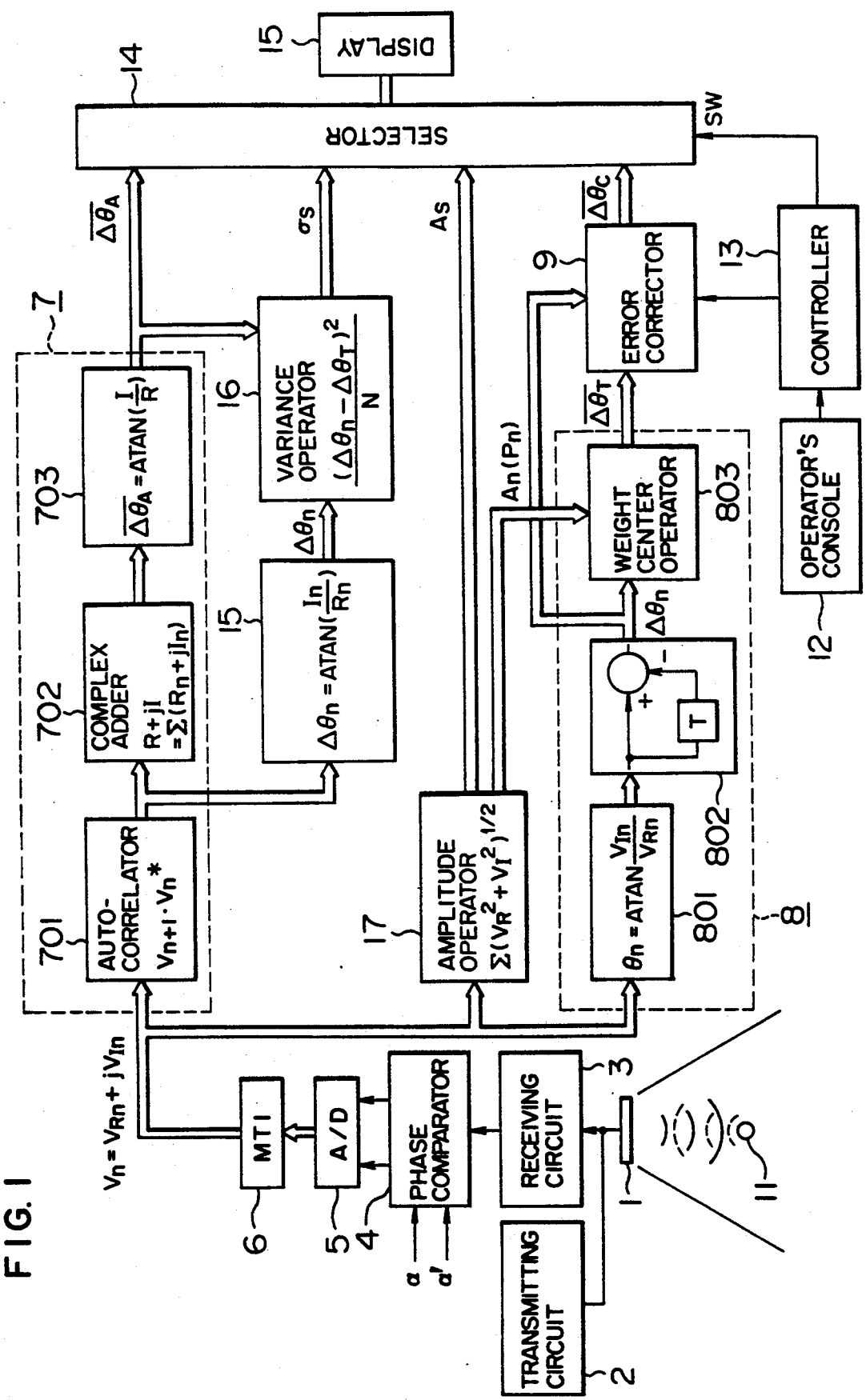
FIG. 1 is a block diagram showing an embodiment of the present invention.

FIG. 1 is a block diagram showing the whole construction of an embodiment of an ultrasonic pulse Doppler measuring apparatus according to the present invention.

The present embodiment is characterized in that the phase difference averaging method capable of improving a signal-to-noise ratio is used as a fundamental method, an output according to the phase difference averaging method is selected for a low Doppler velocity, and an output according to the autocorrelation method is selected for a medium or high Doppler velocity. The outline of the operation of the present embodiment is as follows.

A transmitting circuit 2 outputs a pulsed continuous wave to a transducer 1 at predetermined intervals T. Thus, the transducer 1 emits an ultrasonic pulsed continuous wave toward a reflecting body 11 at the predetermined intervals. A reflected acoustic wave is produced and returns to the transducer 1. Reflection signals from the transducer 1 are successively detected by a receiving circuit 3. In a Phase comparator 4, detected received signals are mixed with two kinds of reference signals $\alpha = A \cos \omega t$ and $\alpha' = A \sin \omega t$, respectively. Thus Doppler signals $V_R$ and $V_I$ having the phase information of the reflection signals are obtained. An A/D converter 5 samples the signals $V_R$ and $V_I$ of the reflected wave from the reflecting object 11 located at a specified depth, at an interval of T, to convert the sampled signals into digital signals. When the number of the repetition of wave transmission is expressed by n (where $n = 1, 2, 3$, and so on), the digital signals $V'_{Rn}$ and $V'_{In}$ are given by the following equations:

$$V'_{Rn} = A_n \cos\theta'_n \quad (1)$$

$$V'_{In} = A_n \sin\theta'_n \quad (2)$$

An MTI filter 6 produces a first order difference of the output of the A/D converter 5, to remove the unvariable reflected wave signal coming from a fixed substance. For the sake of simplicity, let us rewrite the equations (1) and (2) in a single equation as follows:

$$V'_n = A_n \exp)j\theta'_n) \quad (3)$$

Then, the output of the MTI filter is given by the following equation:

$$V_n = V'_n - V'_{n-1} \quad (4)$$

Hereinafter $V_n$ will be referred to as a "phase vector".

The successively obtained phase vectors $V_n$ are applied to a first average phase difference calculating circuit 7 for calculating an average phase difference by the autocorrelation method and to a second average phase difference calculating circuit 8 for calculating an average phase difference by the phase difference averaging method.

The phase vectors are applied to an autocorrelator (that is, phase difference detector) 701. The autocorrelator 701 carries out the complex multiplication of the phase vector $V_n$ and the complex conjugate vector $V^*_{n-1}$ of the phase vector $V_{n-1}$ preceding by one period. When the output obtained as the result of complex multiplication is expressed b $Y_n$, the output $Y_n$ is given by the following equation:

$$Y_n = V_n V^*_{n-1} = R_n + jI_n \quad (5)$$

A complex adder 702 adds the outputs $R_n+jI_n$ of the autocorrelator 701 N times. When the sum thus obtained is expressed by $R+jI$, the sum $R+jI$ is given by the following equation:

$$R + jI = \frac{1}{N} \sum_{n=1}^{N} (R_n + jI_n) \tag{6}$$

An ATAN memory 703 stores therein a table for obtaining the argument of a vector from the real and imaginary parts thereof. When the real part R and imaginary part I of the vector obtained as the result of addition made by the complex adder 702 are applied to the memory 703, the argument of the above vector is read out. The read-out argument is used as the output $\overline{\Delta\theta}_A$ of the first average phase difference calculating circuit 7. The output $\overline{\Delta\theta}_A$ can be simply expressed by the following equation:

$$\overline{\Delta\theta}_A = \tan^{-1}(I/R) \tag{7}$$

In the second average phase difference calculating circuit 8, another average phase difference $\overline{\Delta\theta}_T$ is calculated, each time N phase vectors are supplied to the circuit 8. When the real part $V_{Rn}$ and imaginary part $V_{In}$ of each phase vector $V_n$ are applied to an ATAN memory 801 having the same construction as that of memory 703, the argument $\theta_n$ of the phase vector is read out. In a phase difference detector 802, the difference between the current argument $\theta_n$ and argument preceding by one period is detected, to deliver a phase difference $\Delta\theta_n$. The phase difference $\Delta\theta$ is delivered in the form of the principal value of a difference angle. Accordingly, the phase difference $\Delta\theta_n$ is given by the following equation:

$$\begin{aligned}\Delta\theta_n &= \theta_n - \theta_{n-1} \quad \text{for } |\theta_n - \theta_{n-1}| < 180° \\ &= \theta_n - \theta_{n-1} - 360 \text{ for } \theta_n - \theta_{n-1} > 180° \\ &= \theta_n - \theta_{n-1} + 360 \text{ for } \theta_n - \theta_{n-1} < -180°\end{aligned} \tag{8}$$

Each time N phase difference values $\Delta\theta_n$ are delivered, the phase difference values are added and averaged to obtain an average phase difference. In the present embodiment, however, not only the simple arithmetical mean of the Phase difference values but also the weighted average value with a weight corresponding to the amplitude of each phase vector can be calculated. In an amplitude operator 17, the amplitude $A_n$ of each phase vector $V_n$ is calculated from the real part $V_{Rn}$ and imaginary part $V_{In}$ thereof by the following equation:

$$A_n = (V^2_{Rn} + V^2_{In})^{1/2} \tag{9}$$

Further, in the amplitude operator 17, the sum $A_S$ of the amplitude $A_n$ from $n=1$ to $n=N$ is calculated as follows:

$$A_S = \sum_{n=1}^{N} A_n = \sum_{n=1}^{n} (V^2_{Rn} + V^2_{In})^{\frac{1}{2}} \tag{10}$$

In a weight center operator 803, the average phase difference $\overline{\Delta\theta}_T$ is calculated by using the amplitude $A_n$, as indicated by the following equation:

$$\overline{\Delta\theta}_T = \frac{\sum_{n=1}^{N} A_n \Delta\theta_n}{\sum_{n=1}^{N} A_n} \tag{11}$$

In a case where the simple arithmetical mean is selected, the amplitude $A_n$ applied to the operator 803 is made equal to 1. In this case, the average phase difference is given by the following equation:

$$\overline{\Delta\theta}_T = \frac{1}{N} \sum_{n=1}^{N} \Delta\theta_n \tag{12}$$

Further, the amplitude operator 17 may be replaced by a circuit for calculating the power $P_n$ of the phase vector by the following equation, to obtain the following power-weighed average phase difference:

$$P_n = (V^2_{Rn} + V^2_{In}) \tag{13}$$

$$\overline{\Delta\theta}_T = \frac{\sum_{n=1}^{N} P_n \Delta\theta_n}{\sum_{n=1}^{N} P_n} \tag{14}$$

This value $\overline{\Delta\theta}_T$ is used as the output of the second average phase difference calculating circuit 8. According to the calculation of average value based upon the addition of phase difference values, when a true phase difference angle as put outside of a range from $-180°$ to $180°$ in the adding process, the phase difference angle is folded back as indicated by the equation (8), and thus an error is introduced into the result of addition. Now, let us consider a case where the true phase $\theta$ of the phase vector $V_n$ changes as indicated by a broken line in FIG. 2. When the true phase difference between the present phase and the preceding phase exceeds $180°$ at a time point i, the phase difference is expressed by an angle within a range from $-180°$ to $180°$. At this case, the sum of phase difference values changes as indicated by a solid line. Thus, an error of $-360°$ is introduced. Accordingly, the average value of N phase difference values has an error of $-360°/N$. Similarly, when two true phase difference angles exceed $180°$, an error of $-720°/N$ is introduced.

An error corrector 9 shown in FIG. 1 checks the introduction of such errors into the value $\overline{\Delta\theta}_T$ and performs a correcting operation. That is, the error corrector 9 forms a plurality of presumed average values having the above errors, and estimates the presumed average values to select the most appropriate one, thereby performing the correcting operation. The error corrector 9 is formed of a programmable data processor.

Figure 2:
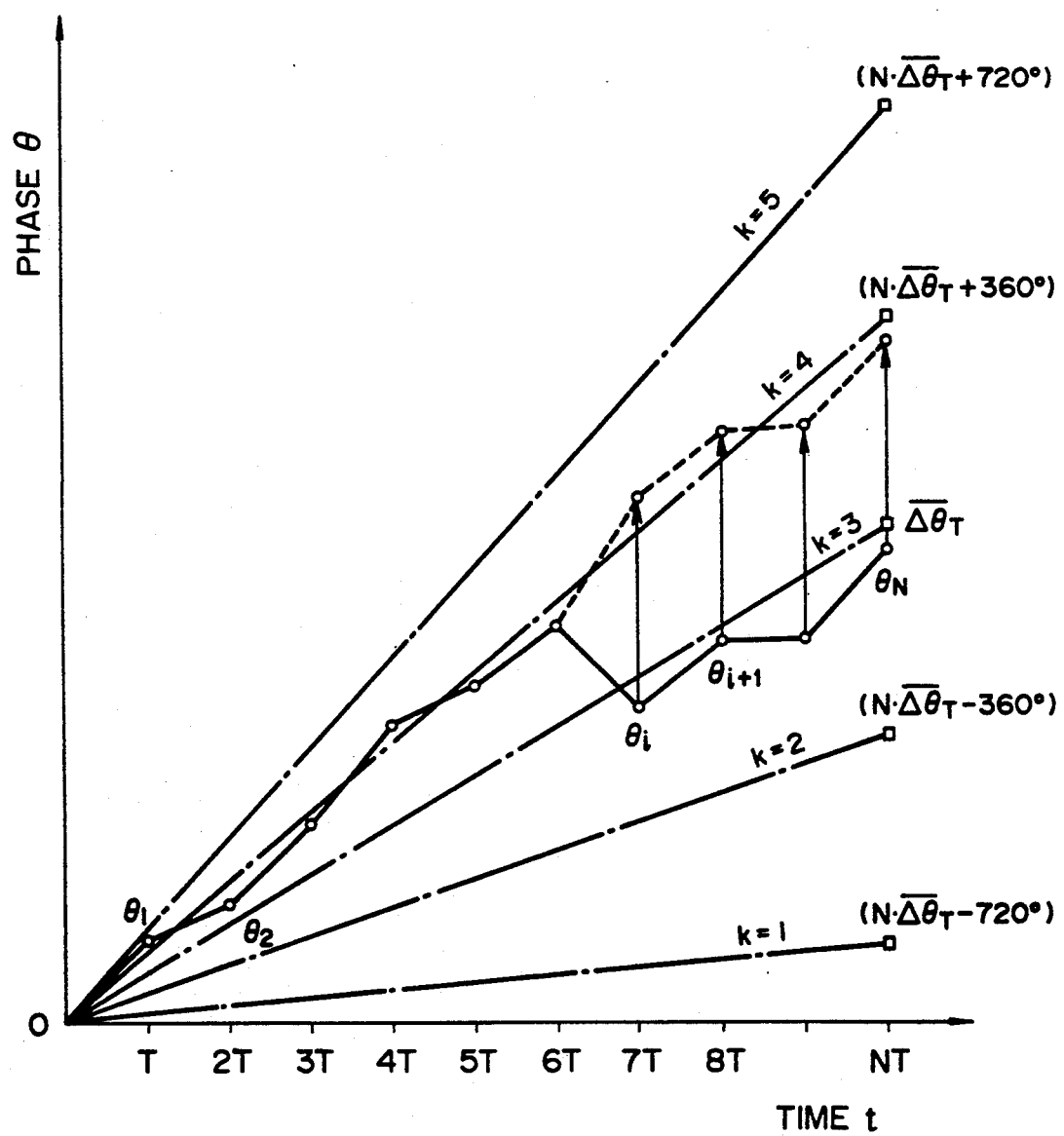
FIG. 2 is a diagram showing phase change characteristics which are used for explaining the principle of phase error correction in the embodiment of FIG. 1.
Figure 3:
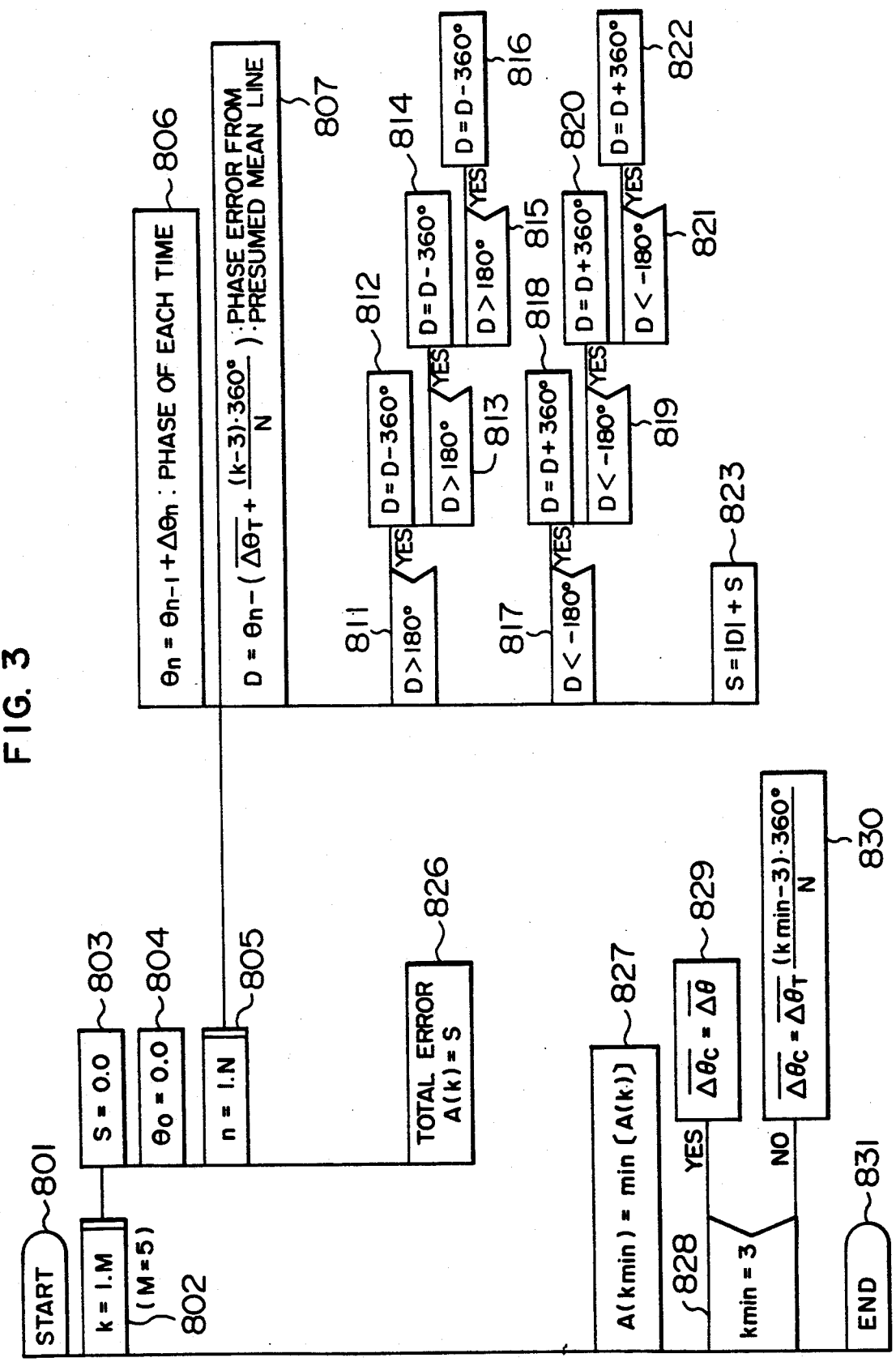
FIG. 3 is a problem analysis diagram showing the operation for, the above phase error correction.

FIG. 3 shows an example of the phase difference correcting program executed by the error corrector 9, in the form of a PAD (Problem Analysis Diagram). In this example, five kinds of presumed average values are estimated. After the program has been started in step 801, the repetition index k of repeated processing is set, in step 802, to a numeral of 1 to M (in the present example, $M=5$). The repeated processing includes steps 803 to 805. In the steps 803 and 804, the initial value of an error S and the initial value $\theta_0$ of an angle are set to zero. Next, the repetition index n of repeated processing is set, in the step 805, to a numeral of 1 to N (where N is the number of sampled angles to be averaged). The contents of the repeated processing are as follows. In step 806, the phase difference values $\Delta\theta_1$ to $\Delta\theta_n$ of phase difference values $\Delta\theta_1, \Delta\theta_2, \ldots, \Delta\theta_N$ which are successively delivered from a block 732 of the average phase difference calculating circuit 7, are added to obtain a phase $\theta_n$. FIG. 2 shows the change of $\theta_n$ with the variable n (where n = 1, 2, 3, ... N). Meanwhile, by using the value $\overline{\Delta\theta_T}$ calculated by the average phase difference calculating circuit 8, five presumed average values which are to be estimated are given by the following equation:

$$\overline{\Delta\theta_k} = \overline{\Delta\theta_T} + \frac{(k-3) \cdot 360°}{N} \quad (15)$$

where k = 1, 2, 3, 4 and 5.

Let us suppose that the phase difference values are not dispersed at all, and each of the phase difference values is equal to the presumed average phase difference $\Delta\theta_k$. Then, an integrated value of the phase difference values will travel on each of five dot-dash lines shown in FIG. 2. Accordingly, in step 807, the difference D between the sum $\theta_n$ of actual phase difference values $\Delta\theta_1$ to $\Delta\theta_n$ and a corresponding value on each dot-dash line is calculated from the following equation:

$$D = \theta_n - \left(\overline{\Delta\theta_T} + \frac{(k-3) \cdot 360°}{N}\right) n \quad (16)$$

Next, in steps 811 to 822, the difference D is transformed into the principal value thereof (that is, a value within a range from −180° to +180°). Next, in step 823, the absolute value of the principal value of the difference D is added to an error S which has been obtained by the preceding processing, to obtain a new value of the error S. The above processing is repeatedly carried out from n = 1 to n = N. The error S thus obtained is an index for indicating the degree of coincidence between one of the dot-dash lines of FIG. 2 and the solid line. Accordingly, in step 826, a total error A(k) is set to this value of S. The above process is repeated from k = 1 to k = 5, as indicated by the step 802. In other words, five total errors A(k) are obtained which indicate the degree of coincidence between each of five dot-dash lines shown in FIG. 4 and the solid line. Strictly speaking, since the program includes the process shown in the steps 811 to 822 for transforming the difference D into the principal value thereof, the value of A(k) does not indicate the total sum of difference values between the solid line of FIG. 4 and each dot-dash line, but indicates the total sum of absolute values of principal values of the above difference values. When the repetitive process for each of k = 1 to k = M is completed, five total errors A(k) thus obtained (where k = 1, 2, 3, 4, 5) are compared with one another, to select the smallest one of five total errors, and the variable k of the smallest total error A(k) is expressed by $k_{min}$ (step 827). Thus, it is known which of five dot-dash lines indicates a correct average value most accurately. In steps 828 and 829, the most appropriate average value $\overline{\Delta\theta_c}$ is calculated from the following equation:

$$\overline{\Delta\theta_c} = \overline{\Delta\theta_T} + \frac{(k_{min} - 3) \cdot 360°}{N} \quad (17)$$

Specifically, as shown in the step 829, the $\overline{\Delta\theta_c}$ for $k_{min} = 3$ is given as follows:

$$\overline{\Delta\theta_c} = \overline{\Delta\theta_T} \quad (18)$$

In a case where the aliasing of angle occurs only once at the time point n = i as indicated by a broken line in FIG. 2, an average value for k=4, that is, $\overline{\Delta\theta_T} + 360°/N$ is the correct average value. In the above-mentioned program, the difference D is transformed into the principal value thereof by the process of the steps 811 to 822. Thus, after the time point n = i, the difference values between the shifted data on the broken line and data on the dot-dash line for k = 4 are added. Accordingly, it is judged by the program that the total error A(4) is the smallest one of the total errors A(k), where k = 1, 2, 3, 4 and 5. Thus, the correct average value is rightly selected.

Referring back to FIG. 1, the above explanation will be continued. One of the output $\overline{\Delta\theta_A}$ of the first average phase difference calculating circuit 7 and the correct output $\overline{\Delta\theta_c}$ of the second average phase difference calculating circuit 8 is selected and transformed into a Doppler shift frequency $\omega'_d$ by a selector 14. The frequency $\omega'_d$ is delivered from the selector. The variance $\sigma_s$ of angles which is necessary for the above selection is calculated on the basis of the average phase difference $\overline{\Delta\theta_A}$. Each time a phase difference vector $Y_n$ from the autocorrelator 701 is applied to an ATAN memory 15, the argument of the vector $Y_n$, that is, the phase difference angle $\overline{\Delta\theta_n}$, is read out from the memory 15. In a variance operator 16, the variance $\sigma_s$ of phase difference angles $\overline{\Delta\theta_n}$ for the average value $\overline{\Delta\theta_T}$ (where n = 1, ... N) is calculated from the following equation:

$$\sigma_S = \frac{1}{N} \sum_{n=1}^{N} (\Delta\theta_n - \Delta\theta_T)^2 \quad (19)$$

In the selector 14, an operation for determining which of $\overline{\Delta\theta_T}$ and $\overline{\Delta\theta_A}$ is selected as the blood flow speed $\omega_d$ displayed by a display device 15, is performed while using the argument (namely, average phase difference) $\overline{\Delta\theta_A}$ obtained by the autocorrelation method, the variance $\sigma_s$, and the amplitude sum $A_s$ obtained by the amplitude calculator 17 as parameters.

Figure 4:
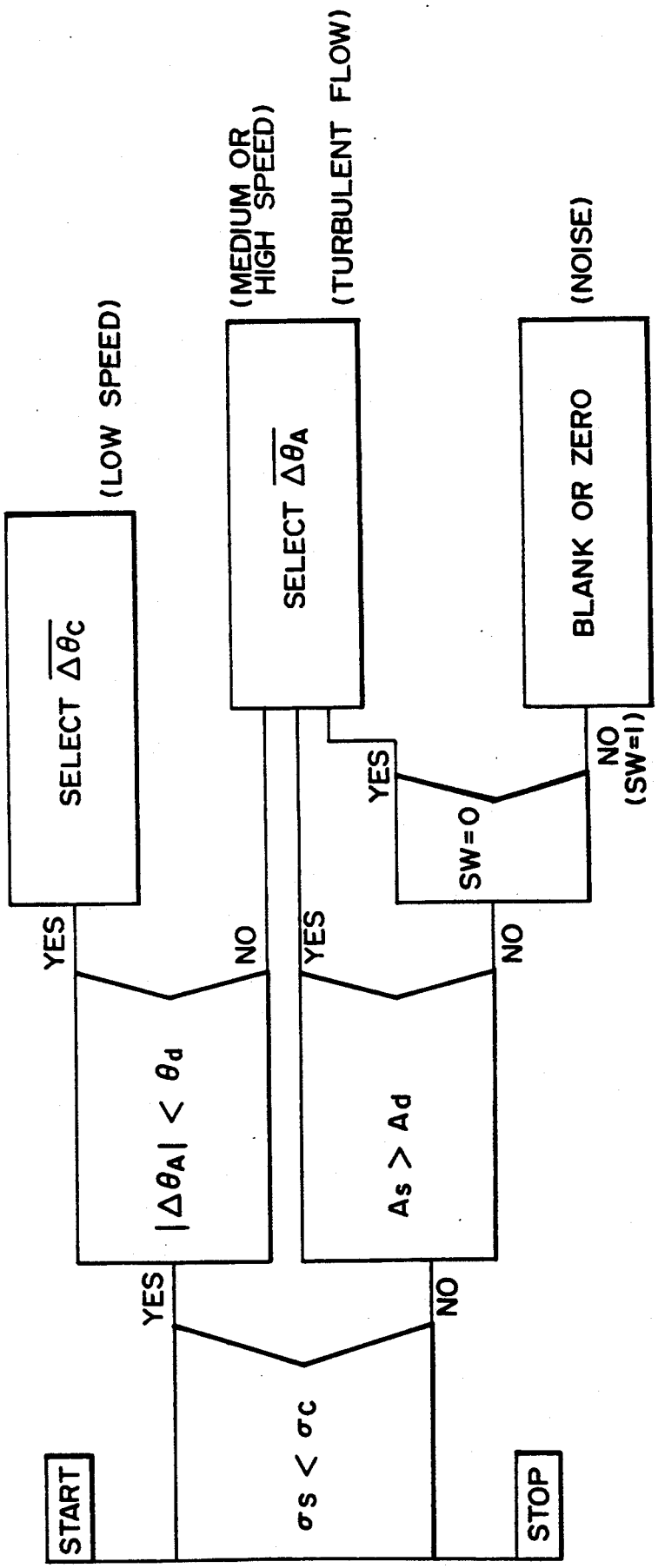
FIG. 4 is a problem analysis diagram showing the average value selection algorithm used in the embodiment of FIG. 1.

FIG. 4 shows the PAD of the selection algorithm. In FIG. 4, $\sigma_c$ indicates a threshold value for the variance of angles. First, it is checked whether or not $\sigma_s$ is less than $\sigma_c$. When the result of check is "YES", it is checked whether or not the absolute value of $\overline{\Delta\theta_A}$ is less than a threshold value $\theta_d$ for an angle. When the result of check is "YES", $\overline{\Delta\theta_T}$ is selected as a blood flow speed. When the result of check is "NO", $\overline{\Delta\theta_A}$ is selected as a blood flow speed. Further, when $\sigma_c$ is greater than or equal to $\sigma_c$, it is checked whether or not the amplitude sum $A_S$ is greater than a threshold value $A_d$ for the intensity of reflected wave. When the result of check is "YES", $\overline{\Delta\theta_A}$ is selected as the blood flow speed. When the result of the check is "NO", displayed data is determined, depending upon the value of a switch SW set by an operator. In the case of SW = 0, $\overline{\Delta\theta_A}$ is selected, independently of the magnitude of $A_S$. In the case of SW = 1, it is judged that noise is measured because of $A_s < A_d$, and thus a display screen is made blank, or a speed of zero is displayed. By adjusting the gain of an amplification system and utilizing the switch SW, a displayed image can be changed in accordance with various purposes.

Further, one of $\overline{\Delta\theta}_T$ and $\overline{\Delta\theta}_A$ can be selected by a switch on an console 12 independently of the judgement due to the selection algorithm. Further, the average value $\overline{\Delta\theta}_T$ or $\overline{\Delta\theta}_A$ itself may be applied, as a signal indicating a blood flow speed $\omega_d$, to the display device 15. In order to calculate $\omega_d$ accurately, it is necessary to use a divider for dividing the average value $\overline{\Delta\theta}_T$ or $\overline{\Delta\theta}_A$ by the period T of transmitted wave. That is, an apparatus, in which the period T is selected from a plurality of values, cannot dispense with such a divider.

We claim:

1. A method of correcting an average phase difference obtained by an ultrasonic Doppler flow meter, comprising the steps of:

transmitting an ultrasonic pulsed continuous wave repeatedly toward an object at predetermined intervals to receive a wave reflected from the object and to detect the phase of the reflected wave, thereby generating a phase vector each time the reflected wave is received;

detecting the phase difference between a current phase vector and a preceding phase vector each time the phase vector is obtained;

adding and averaging a predetermined number of phase difference values to obtain a primary average phase difference value;

calculating a plurality of presumed average phase difference values having an error due to the aliasing of angle from the primary average phase difference value;

adding the phase difference values successively, and detecting the change of a phase in the adding process;

calculating a principal value of the difference between the change of a phase based upon each of the presumed average phase difference values and the change of a phase in the adding process, at a plurality of time points, and adding the principal values calculated at the time points to obtain a total error with respect to each presumed average phase difference value; and selecting that one of the presumed average phase difference values which produces the smallest total error to use the selected presumed average phase difference value as a corrected average phase difference value for indicating the average speed of the object.

2. A method according to claim 1, wherein one of the presumed average phase difference values is equal to the primary average phase difference value, and remaining ones of the presumed average phase difference values differ from the primary average phase difference value by $\pm m \cdot 360°$, N where m = 1, 2, 3, and so on, and N indicates the number of phase difference values to be averaged.

3. A method according to claim 1, wherein the principal value of the difference between the change of a phase based upon each presumed average phase difference value and the change of a phase in the adding process is calculated each time a phase difference value is added to a preceding sum of phase difference values.

4. A pulse Doppler flow meter comprising:

transmitter-receiver means for transmitting an ultrasonic pulsed continuous wave repeatedly toward an object at predetermined intervals and receiving a wave reflected from the object to obtain a reception signal;

phase detecting means for generating a phase vector indicative of the phase of the reception signal each time the reception signal is obtained;

phase difference detecting means for detecting the phase difference between a current phase vector and a preceding phase vector each time the phase vector is obtained;

average phase difference calculating means for adding and averaging a plurality of phase difference values outputted from the phase difference detecting means to obtain a primary average phase difference value;

means for calculating a plurality of presumed average phase difference values from the primary average phase difference value and for calculating total errors indicative of the degree of coincidence between the change of a phase caused by adding the phase difference values successively and the change of a phase based upon each of the presumed average phase difference values, to select that one of the presumed average phase difference values which produces the smallest total error as a corrected average phase difference value; and display means for displaying the corrected average phase difference value as the average speed of the object.

5. An ultrasonic Doppler flow meter comprising:

transmitter-receiver means for transmitting an ultrasonic pulsed continuous wave repeatedly toward an object at predetermined intervals and receiving a wave reflected from the object to obtain a reception signal;

phase detecting means for generating a phase vector indicative of the phase of the reception signal each time the reception signal is obtained;

first average phase difference calculating means for calculating a phase difference vector by autocorrelation processing between a current phase vector and a preceding phase vector, to calculate a first average phase difference value from the argument of the sum vector of a plurality of phase difference vectors;

second average phase difference calculating means for detecting the phase difference between the current phase vector and the preceding phase vector and for adding and averaging a plurality of phase difference values to obtain a second average phase difference value;

phase difference correcting means for calculating a plurality of presumed average phase difference values from the second average phase difference value and for calculating total errors indicative of the degree of coincidence between the change of a phase caused by adding the phase difference values successively and the change of a phase based upon each of the presumed average phase difference values to select that one of the presumed average phase difference values which produces the smallest total error as a corrected second average phase difference value; and selection means for selecting one of the first average phase difference value and the corrected second average phase difference value as the average speed of the object.

* * * * *